US005568602A

United States Patent [19]
Callahan et al.

[11] Patent Number: 5,568,602
[45] Date of Patent: Oct. 22, 1996

[54] METHOD AND APPARATUS FOR GAME DEVELOPMENT USING CORRELATION OF TIME SEQUENCES AND DIGITAL VIDEO DATA

[75] Inventors: Sean M. Callahan, Cupertino; Edward Harp, San Jose; Bruce Leak, Palo Alto, all of Calif.

[73] Assignee: Rocket Science Games, Inc., San Francisco, Calif.

[21] Appl. No.: 330,912

[22] Filed: Oct. 28, 1994

[51] Int. Cl.⁶ ........................................ G06T 13/00
[52] U.S. Cl. .................. 395/154; 395/152; 395/153; 395/155; 395/160; 395/140
[58] Field of Search .......................... 395/154, 152, 395/153, 118, 133, 140, 141, 155, 1, 161

[56] References Cited

U.S. PATENT DOCUMENTS 5,404,316  4/1995  Klingler et al. ................ 395/118 X

FOREIGN PATENT DOCUMENTS

0497327A3  8/1992  European Pat. Off. .
4022384A1  2/1991  Germany .

*Primary Examiner*—Almis R. Jankus
*Attorney, Agent, or Firm*—Gray Cary Ware & Freidenrich

[57] ABSTRACT

The invention provides a method and apparatus for game development. On a first display, a branched time line structure including decision nodes is developed. On a second display, video images are viewed. According to the present invention, portions of the video images are correlated with portions of the branched time line structure so that upon simulated play, a game developer can move along the branched time line structure, taking alternate time paths when reaching decision nodes.

20 Claims, 9 Drawing Sheets

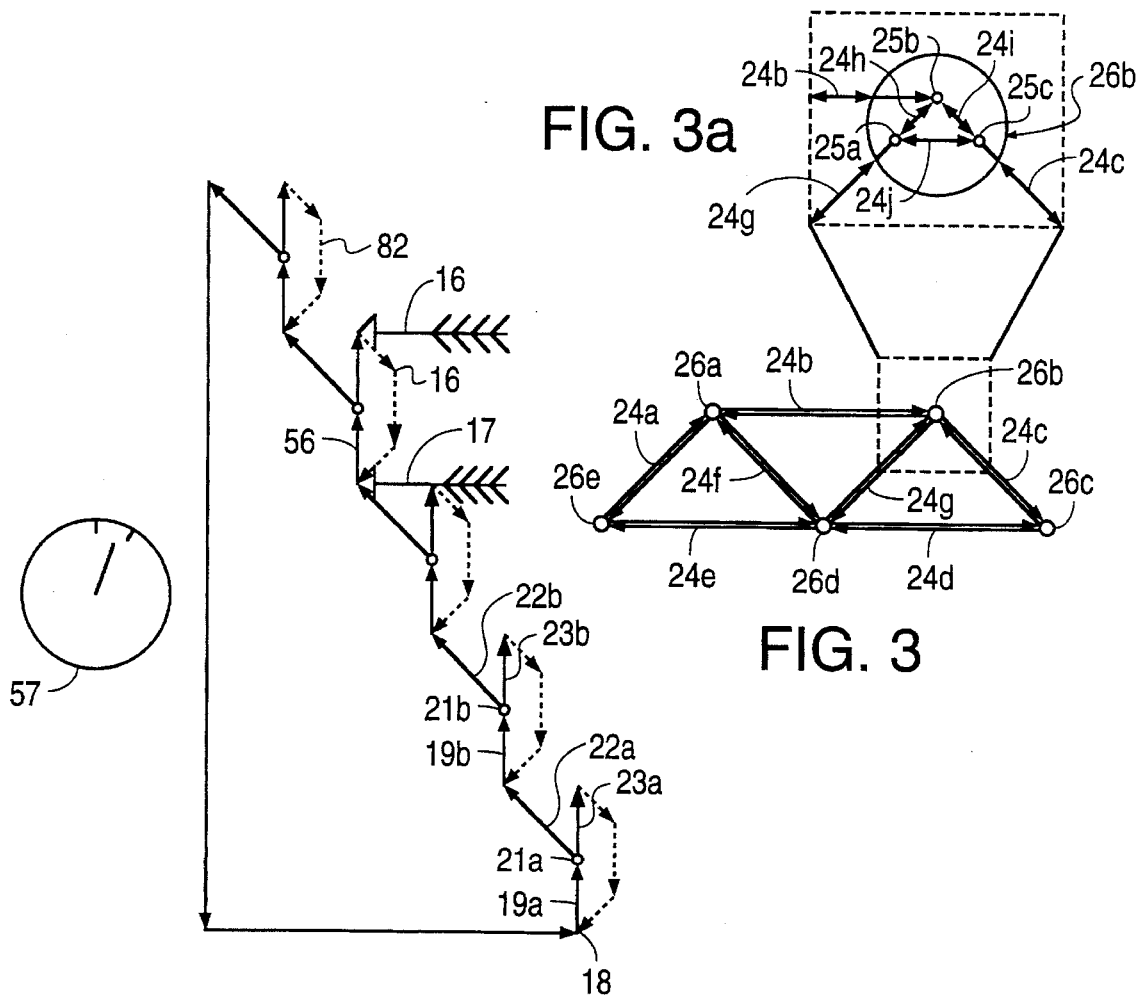
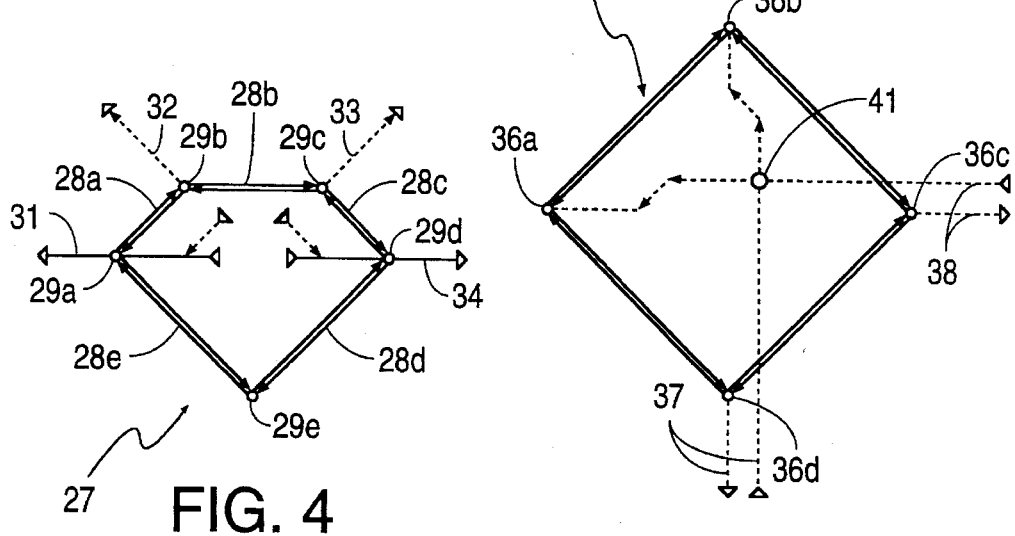
FIG. 2  FIG. 3  FIG. 3a  FIG. 4  FIG. 5

METHOD AND APPARATUS FOR GAME DEVELOPMENT USING CORRELATION OF TIME SEQUENCES AND DIGITAL VIDEO DATA

FIELD OF THE INVENTION

The present invention relates to a method and apparatus for computer game development, and more particularly, to a method and apparatus which correlates digital video data to time sequences providing for ease of manipulation by the operator.

BACKGROUND OF THE INVENTION

Film editing has always been a part of film production. Historically, films have followed a single sequence. Thus, in editing a film, editors cut and pasted film portions one after the other. With the advent of computer gaming however, different events take place depending upon the decision of the user. When the user is given a choice of possible decisions to make, and makes one, the computer's programming accesses certain video image data as a consequence of the user's choice. Thus, in video games, frames of video images are not compiled to be viewed in a simple single stream, but must include the ability to branch into at least one of two time-sequence-based directions depending upon the user input. Accordingly, depending on an event or decision of the user, the computer can access the video segment which corresponds to the chosen time path.

The notion of branching video sequences has been utilized previously, for example, in movie maps. In that application, a user can proceed through a data space which is correlated to a position on a map. When the user reaches an intersection of streets on the map which is represented by a branching node in the data space, the user can choose to take one of a plurality of presented paths. The user directional and/or speed input is provided by a track ball or joy stick.

In game development, a developer might establish a game plan in the form of branched time lines so that he or she may edit film or digital video data to correspond to those time lines. However, this process is cumbersome because the developer must cut and paste the digital video data in an ad hoc manner, since he or she does not have the ability to precisely match the time duration of a particular stream of video images to the time lines of the game plan.

SUMMARY OF THE INVENTION

According to the present invention, a method and apparatus for developing a game is provided. In an editing mode, a first display is used to develop a branched time line structure and a second display is used to view video image sequences. The two displays are coupled so that the structure of the branched time line developed by the user on the first display may be correlated with portions of digital video image sequences viewed on the second display. The branched time line structure developed on the first display includes a first single time line connected to a node which is in turn connected to two or more single time lines. The node represents a decision point in the game.

The second display includes a time indicator for showing the amount of real time a particular image sequence generated by digital video data occupies. The present invention includes the ability to block on the time indicator a portion of a digital video data segment so that it can be correlated with a single time line of the branched time line structure to form a data block which is stored in the computer's data store.

In the playback simulation mode, the combined video and time line data block can be accessed so that it is displayed simultaneously with the branched time line. A position marker which can move along the branched time line indicates the point along the time line which corresponds to a given displayed video image. Thus, the developer has the ability to either view displayed video images in real time or to control the rate at which the time line marker travels along the time line. In the latter configuration, the movement of the position marker is capable of causing the sequential video images to be displayed in a manner that is slower or faster than real time.

BRIEF DESCRIPTION OF THE DRAWINGS

FIG. 2 shows a first time line embodiment of the present invention;

FIG. 3 shows a second time line embodiment of the present invention;

FIG. 4 shows another time line embodiment;

FIG. 5 shows yet another time line embodiment;

DETAILED DESCRIPTION OF THE INVENTION

A computer 11 used in accordance with the present invention preferably includes a sufficient data store to store video data, for example, a hard drive, a video laser disk or a CD-ROM. Peripheral devices and/or equipment can be used as a data store as well or alternatively. The video data is preferably digital rather than analog to enable precision in editing it and manipulation in translation between files by the computer. Any one of various digital video compression schemes can be utilized to condense the amount of storage space required for the video data. Initial unedited digital video data is stored in a first computer file, so that it can be manipulated in accordance with the present invention.

Figure 1:
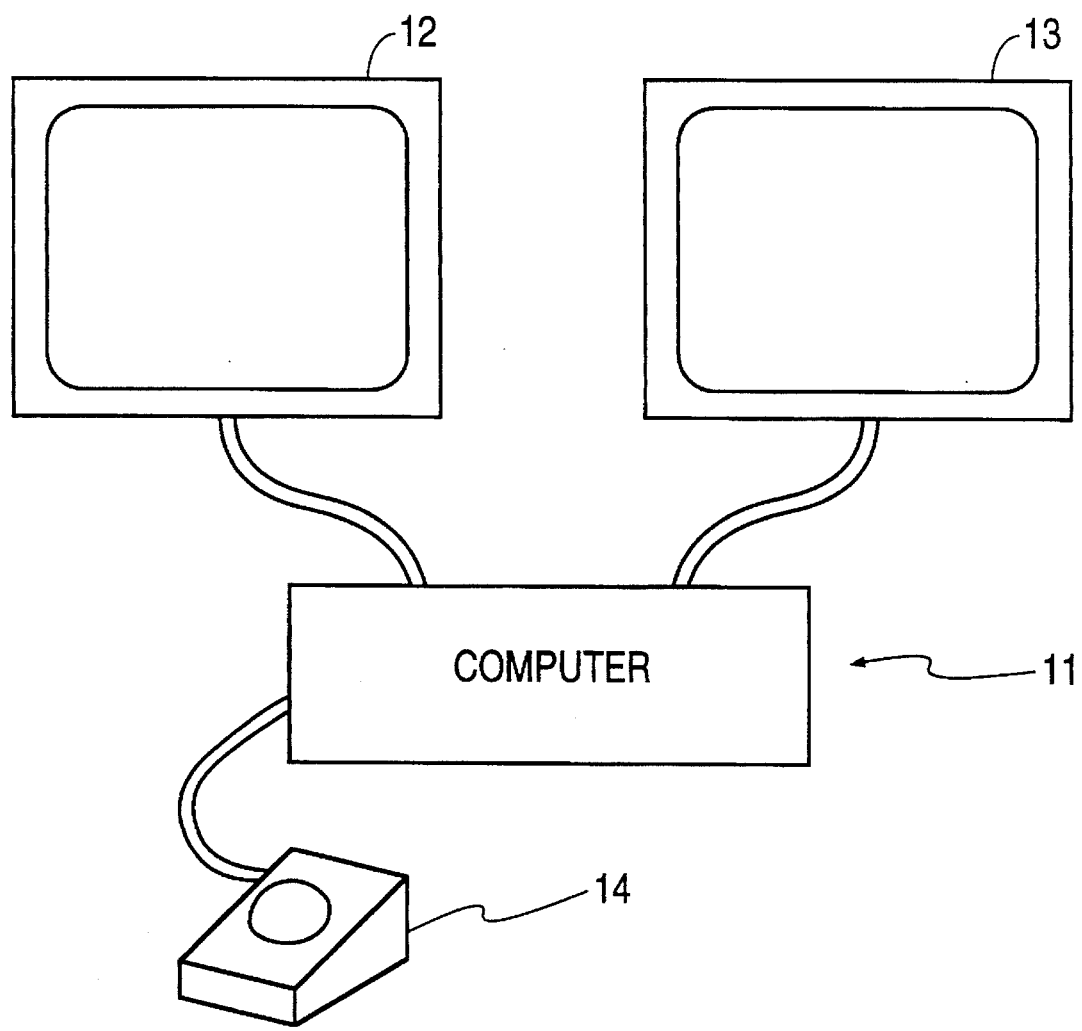
FIG. 1 shows a computer and two displays according to the present invention.

Two displays 12 and 13 are shown in FIG. 1. Each is connected and is responsive to the computer 11. The user uses the two displays 12 and 13 to coordinate the game development process. On the first display 12 the user develops a branched time line structure (see FIGS. 2–6). On the second display 13, the user views the video images and blocks portions so that the video images can be correlated to the branched time line structure created by the user on the first display 12. The correlated data block generated is stored in computer 11. Instead of being separate monitors as shown in FIG. 1, the video data and time line images can be displayed in the form of overlays or windows on a single computer screen. In such a manner, a first window is a first display and a second window is a second display.

A typical operating system such as that used by Apple Computers or Microsoft's Windows program is sufficient to develop the programming to manipulate and combine data to develop a game according to the present invention. Typical word processing or graphical user interface computer programs include programming techniques suitable for programming a computer to perform in accordance with the present invention. The ability to click and drag are most helpful to carrying out the method described herein.

The user input module is the track ball 14. Alternatively, key strokes or other such commands, e.g., voice, can be used for user input depending on the operating system's capabilities. To begin the use of the method and apparatus for game development according to the present invention, a simple graphics program is initiated. Turning to FIG. 2, a branched time line structure developed on a grid of points is shown therein. Attention is turned to point 18 at which the user began to draw a first time line portion 19*a*. (The arrows 16 and 17 will be discussed in detail below.)

To start the development of the branched time line structure, the user double clicks at point 18 and drags the cursor up to another point where the user inserts a node 22*a* to form a single time line. The user then drags the cursor to form separate lines 22*a* and 23*a* one after the other, so that they connect to node 21*a*. The user can repeat the process forming another line 19*b*, node 21*b*, lines 22*b* and 23*b*, and so on. Other types of user graphical interfaces can be used to develop the branched time line structure such as drawing it by hand and scanning it to generate a computer data file. Moreover, a branched time line structure can be drawn in any other manner, such as using machine language or postscript.

The present invention provides for any number of different types of branched time line structures to be formed such as those shown in FIGS. 3, 4 and 5. FIG. 3 shows an example of an intertwined branched time line structure having lines 24*a*–24*g* connected via nodes 26*a*–26*e*. Note that lines 24*a*–24*e* are shown as bi-directional so that the user can move along each of the time lines in the forward or the backward direction. FIG. 3 also includes an expanded view of node 26*b* to show that a branched time line can reside within a node. There, secondary nodes 25*a*, 25*b* and 25*c* are connected by time lines 24*h*, 24*i* and 24*j*. The structure of a node within a node developed in accordance with the present invention is used to create intricate levels of hierarchy in a game plan's structure.

While FIGS. 2 and 3 show a branched time line having time lines connected to nodes, FIGS. 4 and 5 show different types of node configurations. For example, a perspective type of node 27 is shown in FIG. 4. A perspective node is configured so that when a game player reaches a perspective node, the game player can pivot on one or more points within the node to view different time line portion options before embarking thereon. For example, were a game player to advance along a path and then reach a room having five windows, doors, portals or exits, the player would need to decide which to proceed through. In this way, the perspective node maps out in a physical sense the directions one can take from a position inside a perspective node. Alternatively, the perspective node can present time based options only or in combination with physical or directional options, giving the game player the opportunity to pick a time path as he pivots within the node.

Turning to FIG. 4, the user could pivot to the right or to the left, such indicated by lines 28*a*–28*e* which also demonstrate the perimeter of the perspective node 27. Along the perimeter are windows, doors or exits 29*a*–29*e* which lead to the aforementioned time line portion options. If the game player were to choose to advance through exit 29*a*, the user would follow time line 31 having an arrow point at one end and an arrow tail at the other end, in this case, indicating the direction of advancement. Alternatively, the game player could have advanced through exit 29*b*, 29*c* or 29*d* to follow paths 32, 33 or 34 respectively.

FIG. 5 illustrates a similar perspective node to that shown in FIG. 4 showing that advancement by the game player can be made from any window, door or exit 36*a*–36*d* along path 37 or 38, for example. Within node 39, a decision node 41, like nodes 22*a* and 21*b* shown in FIG. 2, is positioned. Node 41 can act as a decision point or can contain yet another node such as the hierarchical structure containing secondary nodes 25*a*–25*c* as shown in FIG. 3.

Turning now to FIG. 6 and FIGS. 7*a*–7*j*, a simple branched time line having starting point 46, nodes 47*a*–47*c* and lines 48*a*–48*d* is shown to illustrate the time line and video image correlation feature of the present invention. Lines 48*a*–48*d* are broken into two lines to show the forward and backward directions more clearly. FIGS. 7*a*–7*j* show frames of video images 51*a*–51*j* generated in response to data signals corresponding to digital video data stored in computer 11. Each display screen is capable of containing other information, such as the time bar 52.

In practice, the branched time line structure is developed to generally map out the sequence of events of the game. When an initially unedited video sequence is viewed, and a portion is chosen or edited portions are extracted to be correlated to the branched time line structure, the single time line portion to which it is correlated will grow or contract in accordance with the length of the chosen video sequence. This is achieved by simple programming means. Alternatively, if data storage space is a concern or for any other reason, the duration of the single time lines in the branched time line structure can be adhered to fully or in part so that video sequences can be edited, slowed down or speeded up, to match the allowable time duration.

Figure 6:
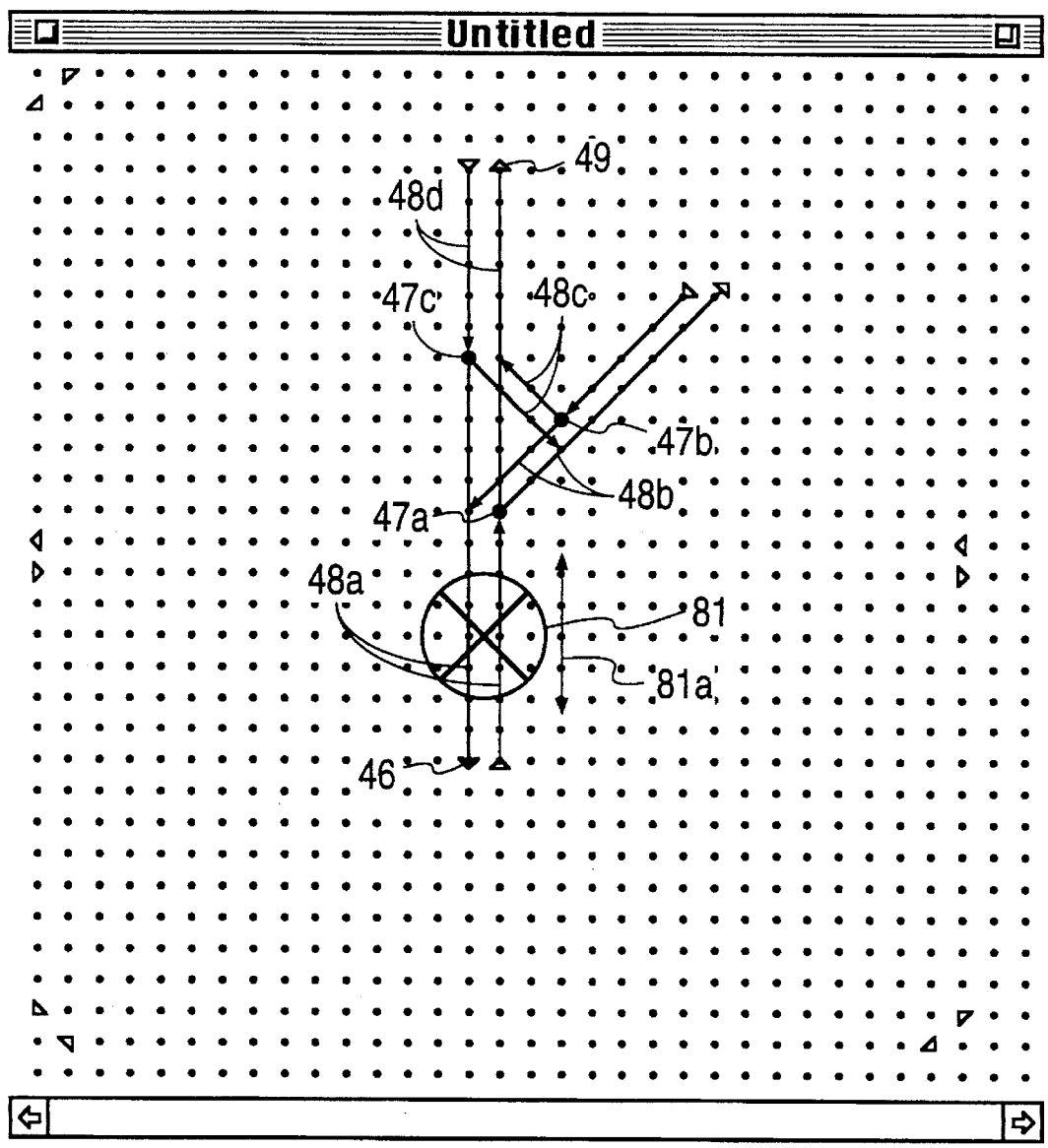
FIG. 6 shows still another time line embodiment according to the present invention.
Figure 7A:
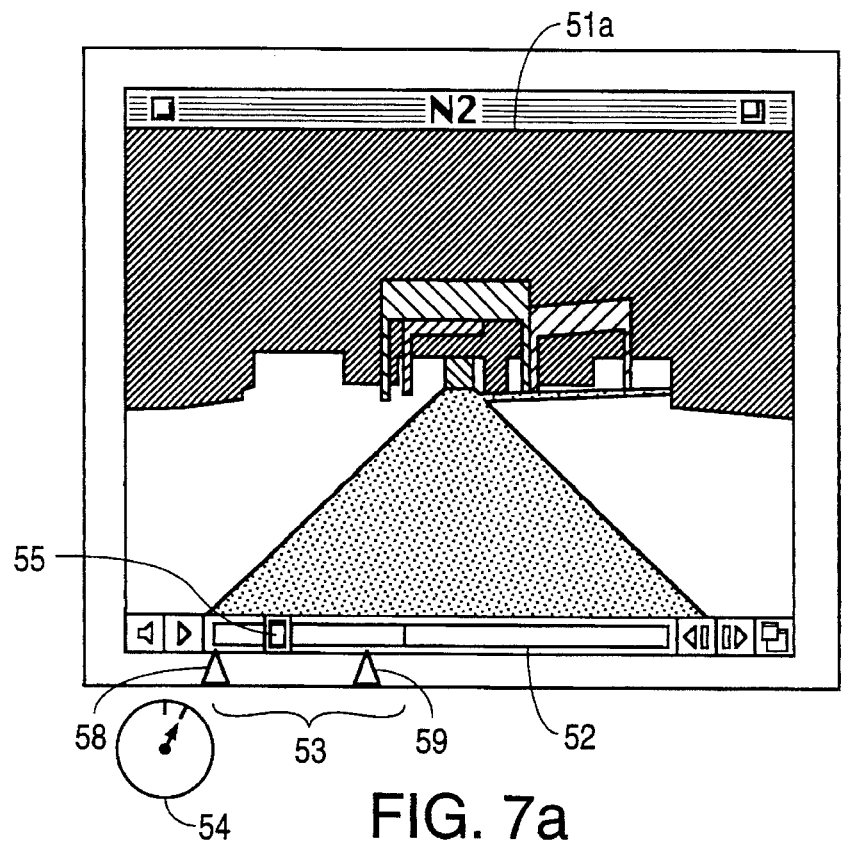
FIGS. 7a–7j show still shots taken from a video image sequence according to the present invention.
Figure 7B:
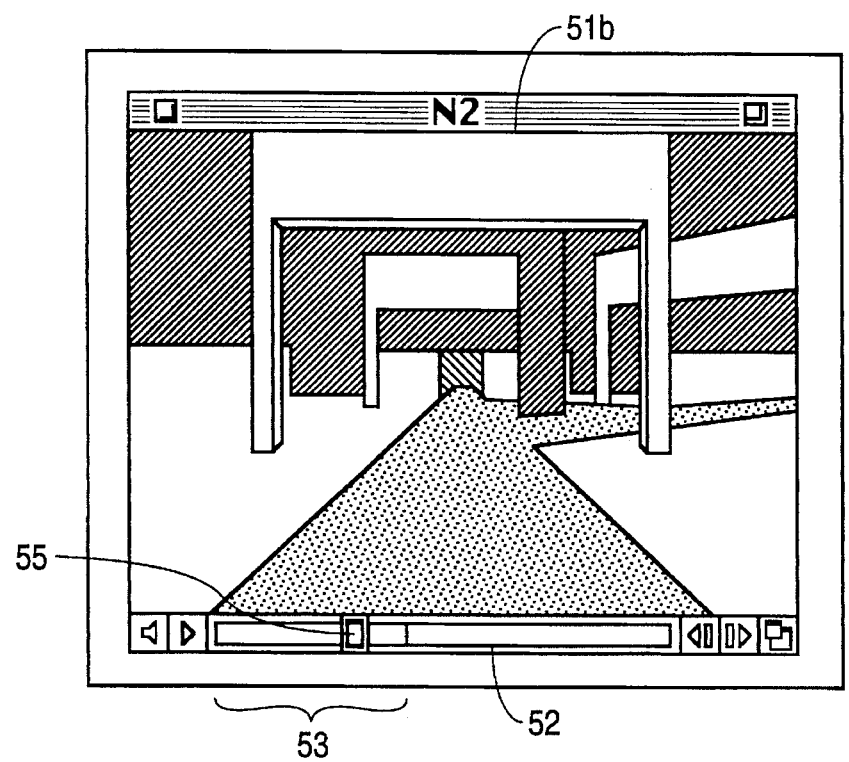
Figure 7C:
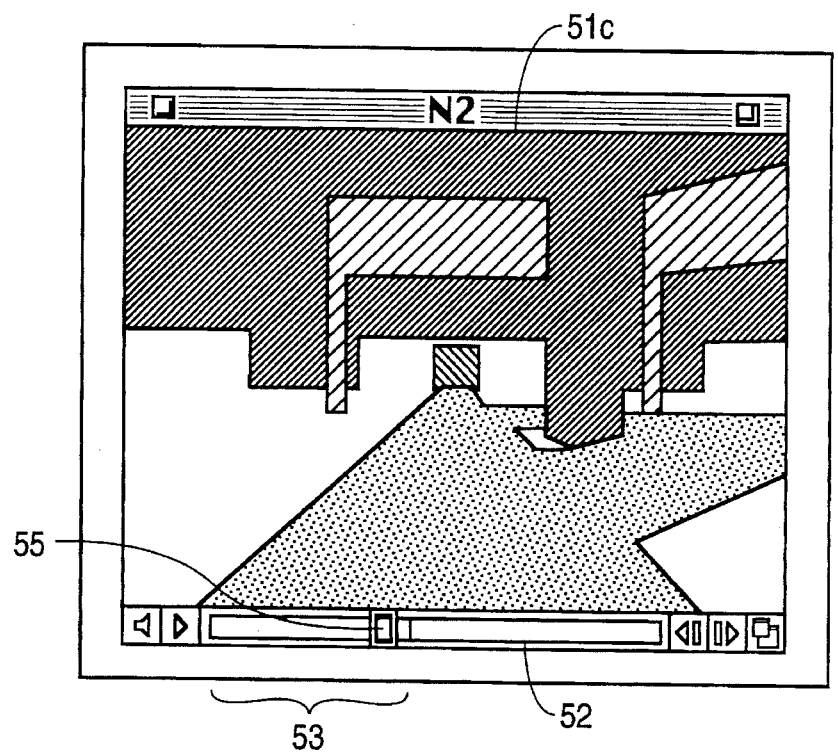
Figure 7D:
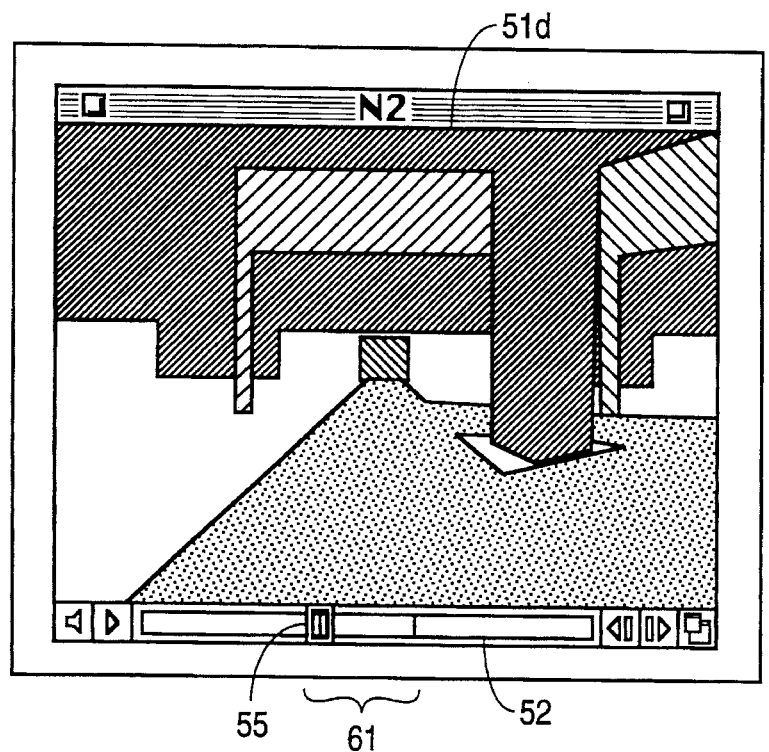
Figure 7E:
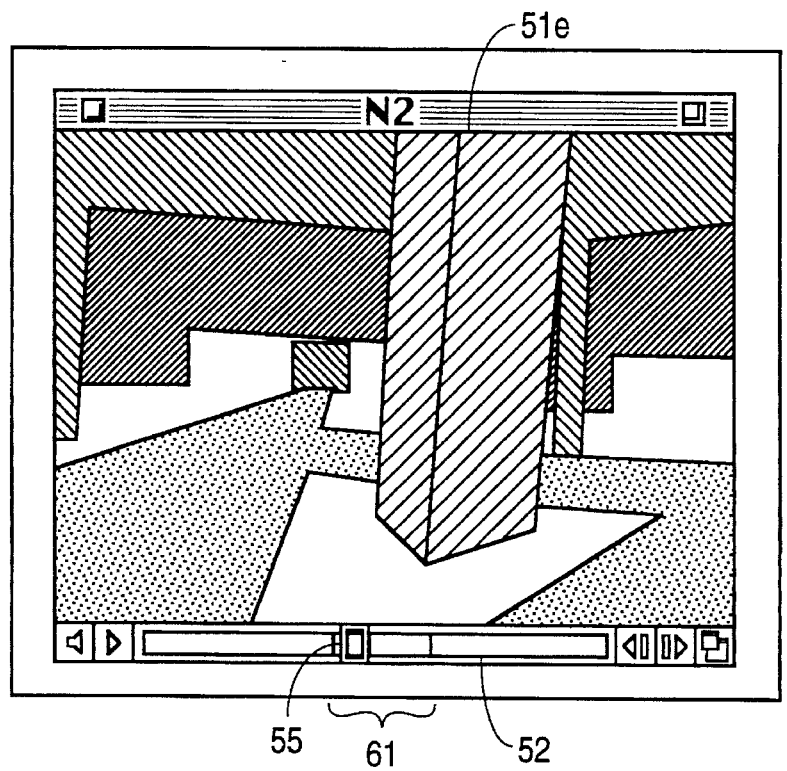
Figure 7F:
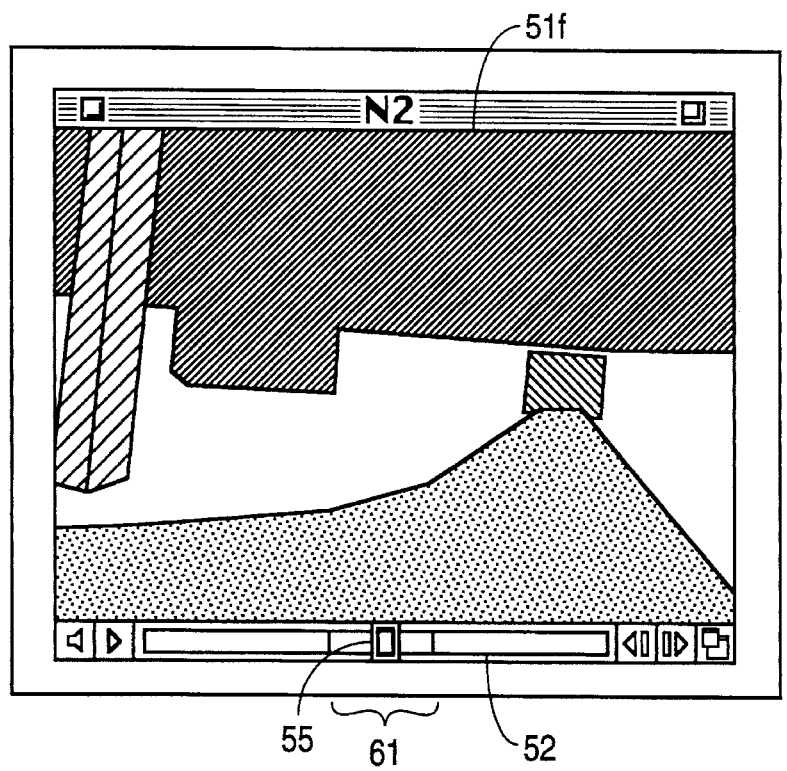
Figure 7G:
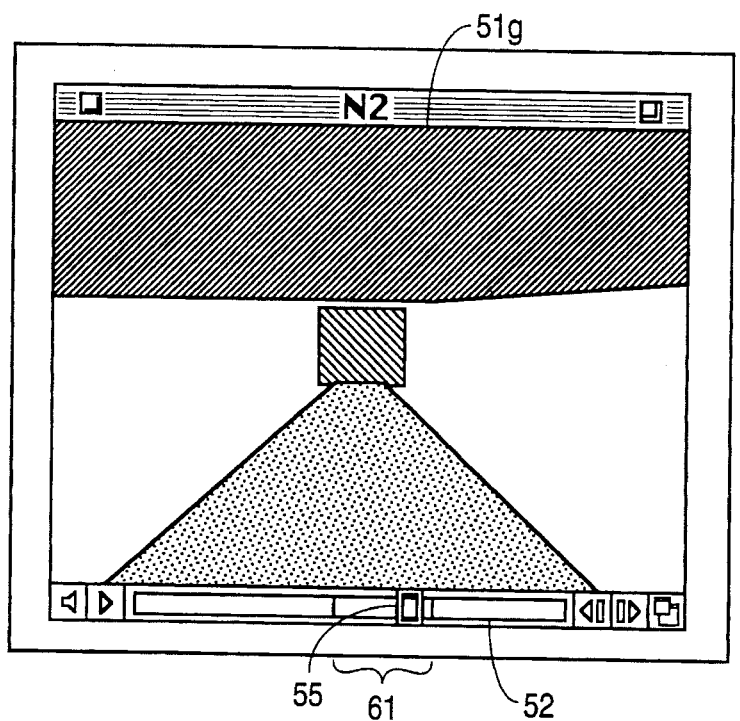
Figure 7H:
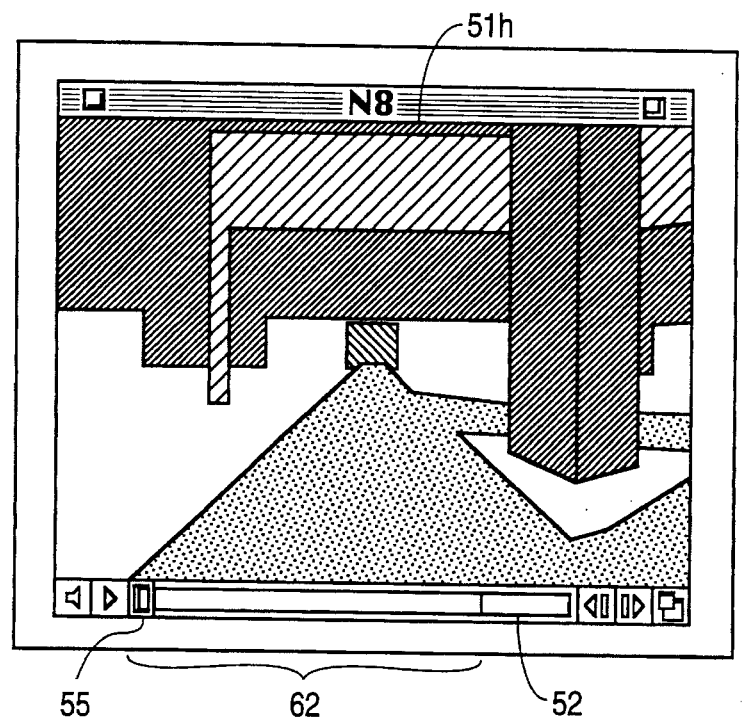
Figure 7I:
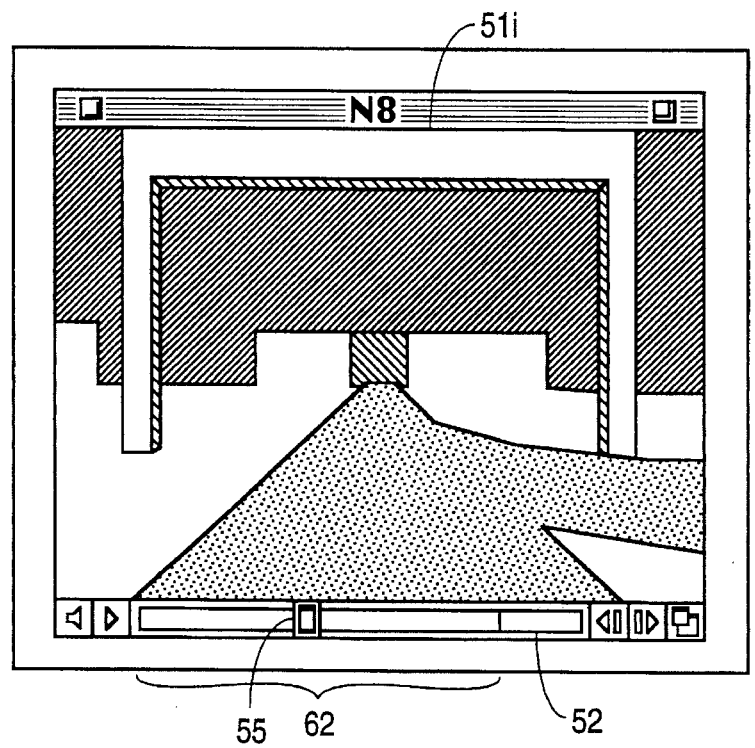
Figure 7J:
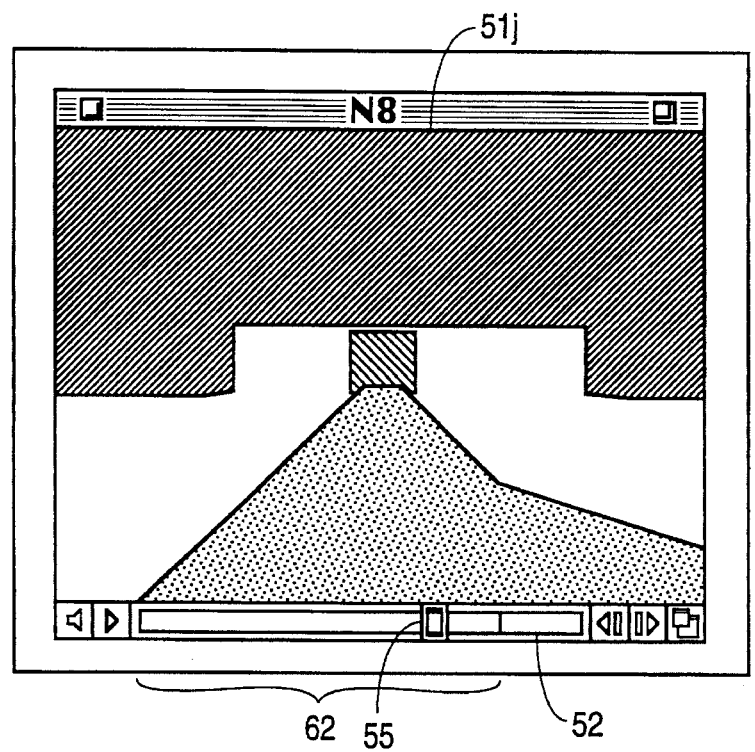

FIGS. 7*a*–7*j* illustrate video sequences which have been correlated with the branched time line structure of FIG. 6. FIG. 7*a* generally corresponds to point 46 on FIG. 6, which is essentially the starting point of that branched time line structure. FIG. 7*b* is a frame which roughly corresponds to half way up line 48*a*. FIG. 7*c* is a frame taken approaching node 47*a* while FIG. 7*d* is taken beyond the decision node 47*a*. FIG. 7*e* is at decision node 47*a* and shows a video image of the decision transition from line 48*a* to 48*b*. FIG. 7*f* shows the decision transition continuing. FIG. 7*g* shows the decision transition completed so that the path defined by line 48*b* can be embarked upon. Alternatively, FIG. 7*h* shows that instead of following a turn to the right, the game player's decision at node 47*a* was to continue in a linear manner and proceed along time line 48*d*. FIG. 7*i* shows the progress along time line 48*d*, nearing decision node 47*c*. FIG. 7*j* shows the position of the image after node 47*c* as if one were to pursue a path to the end at point 49.

The sequence of flames of film footage shown in FIGS. 7*a*–7*j* is illustrative of the correlation between the branched time line structure and a video image sequence because its geographic layout generally matches that of the branched time line shown in FIG. 6. However, any type of sequence of flames of video images having any type of content can be used in accordance with the present invention. The present invention is directed to correlation of a branched time line structure with any sort of time based medium, such as animation, audio, text data or any other type of data which changes over time. For example, time-based information such as which direction a camera is pointing, such providing annotations for interactivity, is also considered within the scope of the present invention.

Returning specifically to FIGS. 7a, 7b and 7c, there, the filled-in portion 53 of time bar 52 which is bracketed is illustrative of the length of real time occupied by that sequence of video images. Clearly, any type of time indication icon can be used such as a conventional clock, a digital read-out, an hour glass or a sundial. If the video sequence shown in FIGS. 7a, 7b and 7c had been unedited (ignoring, for now, FIGS. 7d–7j), then the game developer could see that the real time of the video sequence was, for example, 5 seconds because the filled-in portion 53 of the time bar 52 corresponds to five seconds of real time. For example, clock 54 shows that the time corresponding to the bracketed filled-in portion 53 is 5 seconds. The little marker 55 shows how far along in the video image sequence the frame currently displayed on the second display 13 is. For example, marker 54 is one quarter along portion 53 and therefore at the 1.25 second point of the video image sequence.

Moreover, additional read-outs such as a frame indicator (not shown) can be provided. A frame indicator shows, for example, the number of frames in a particular video sequence, and includes an indicator as to which frame is currently being displayed. Typically, video images are displayed at a rate of 30 frames per second. Thus the time bar 52 and a frame indicator can be lined up so that 30 frame segments are matched to one second on time bar 52.

As discussed above, in order to correlate a chosen video sequence to a single time line, the length of a single time line portion is adjusted to correspond to the real time duration of the chosen video sequence. Returning to FIG. 2, for example, arrows 16 and 17 show a portion 56 of the entire branched time line structure designated. This can be done by changing its color relative to other portions of the branched time line on the screen to highlight it or any other suitable means. Time line clock 57 shows that the designated time line portion has a length of 4 seconds. Therefore, in correlating the video sequence of FIGS. 7a–7c, which is 5 seconds, to time line portion 56, which is four seconds, several options are available.

One option is to use a part of the video sequence equalling 4 seconds. FIG. 7a shows blocking markers 58 and 59 blocking the equivalent four out of the five seconds of the video image sequence. The video data corresponding to the blocked video image sequence is then correlated with time line 56 and stored in a computer data store. Another option is to speed up the video image sequence so that the 5 second sequence takes only 4 seconds and then correlate it to the branched time line 56. These options are available if there are time constraints imposed, such as limited disk space, or market reasons.

However, as mentioned above, it is easier to simply change the length of the time line portion to correspond to the length of the video sequence the user wishes to insert at the point on the branched time line.

The next step is to correlate a video image sequence with the node. This is done in essentially the same manner as the time line. Turning to FIGS. 7d–7g, there, the bracketed filled-in portion 61 on the time bar 52 is shown. The video image sequence represents the images which would appear had a game player chosen to turn right at the node. A perspective node like that shown in FIGS. 4 and 5 could be used to generate the turning effect of the images at node 47a.

Backing up, FIG. 7h, which is nearly identical to FIG. 7d, shows the video image which would be displayed had the game player chosen to continue in the same physical direction as the initial path shown in FIGS. 7a–7c. In FIGS. 7h through 7j, the bracketed filled-in portion 62 of time bar 52 also depicts a certain amount of time.

Figure 8:
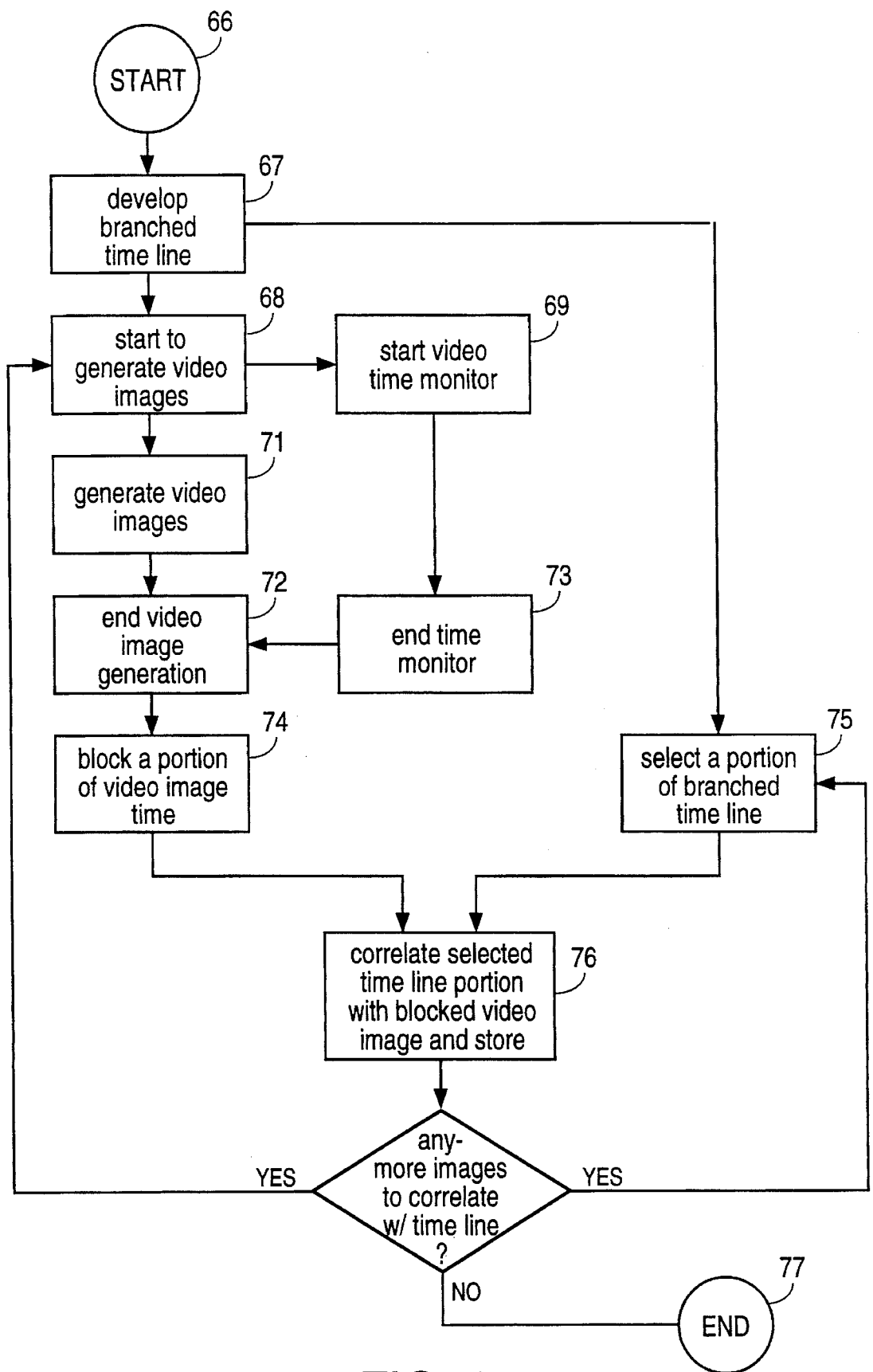
FIG. 8 shows a flow chart of a method according to the present invention.

FIG. 8 shows a flow chart of the sequence of steps a game developer uses in accordance with the present invention. As mentioned above, in step 66 the user starts the development with a double click of the input device. The branched time line is developed in step 67 on the first display 12 as shown in FIGS. 2–6 or in any other suitable manner. On the second display 13, a video image sequence is generated in step 68 from digital video data contained in the data store of computer 11. Simultaneously in step 69, the video time monitor is started. As the video image sequence is displayed in step 71, the video sequence's real time continues to be monitored. On the other hand, a mechanism may be in place to provide the real run-time of the video image sequence without needing to in fact display the data. In any event, at the end of the video sequence, which is step 72, the time monitor ends in step 73. With reference to FIG. 2, a piece 56 of the branched time line is then selected in step 75. Then as shown on the time bar 52 of FIGS. 7a–7j, a portion of the video data is blocked in step 74. The time line piece 56 (see FIG. 2) from the branched time line structure, that is its relative position to other pieces of the time line, and the video image data are then correlated in step 76. Certain parts of the process shown in FIG. 8 are repeated until the game developer has decided that enough correlations have been made. When the game developer is through, the process ends in step 77.

To correlate the video data with the branched time line, the process involves setting up a new file to which to copy chosen video data in an order or arrangement which best provides data access defined by the branched time line structure. In the simplest case, the game developer starts at the bottom of the time line, correlating a first video sequence with a first time line portion. In a linear manner, a second video sequence is correlated to a second time line portion, such second video sequence being copied from the video data file to be read after the first video sequence. After a node is reached, the branching makes correlation more complicated in the sense that the storage in the database or a disc, for example, of the video sequences becomes more random, making access to them slow, at times. Preferably, a data storage scheme provides the ability for quick access to the data upon simulation or actual play. For example, using two data disks, one poised for access to certain data when a decision node is reached, is a method of storing the correlated data. Another method, described in co-pending patent application Ser. No. 08/331,214, entitled *Video Game Porting Compiler and Method of Operating a Video Game*, naming Bruce Leak, Sean M. Callahan, and George Cossey as inventors, filed Oct. 28, 1994, is preferable.

While FIG. 8 shows a flow chart wherein the steps are performed in a parallel manner, that is, the video image is blocked while the time line portion is selected, the same process can be achieved in a serial manner. For example, after the video image sequence is selected, then the time line portion is selected.

The present invention also includes a simulation mode wherein the user can advance through the time line to view the video sequences to which portions have been correlated. Above, the edit mode of the present invention has been described. Therefore, once the selected video image data and the branched time line has been correlated, the game developer can return to the branched time line structure on the first display screen, for example, like that shown in FIG. 6. As mentioned previously, FIG. 6 generally correlates to FIGS. 7a–7j after the process of the present invention has been completed. The ability to cursor along the branched time line structure and view the video images which correspond to given points along the branched time line structure in simulation mode can be done with a joystick to simulate actual game play. In this manner, the game developer can move through the decision nodes at any speed, thus verifying or validating the decision nodes. Of course, any other user input device, such as a trackball or keyboard can also be used during simulation mode. For example, the circular cross-barred cursor 81 can be used to move through the branched time line structure to view the compiled video sequences. The cursor does not need to be directly coupled to the branched time line structure, but needs to be coordinated therewith to provide an indication of which frames are being viewed with respect to the structure. The arrows 82a in both vertical directions show which directions the cursor 81 can move along the branched time line structure to cause the video image sequence on the second display 13 to change in accordance therewith. When the cursor reaches a node, the game developer can toggle to the left or to the right to control the time path taken. To reverse direction, the user can move the joystick back. This allows the game developer to watch the sequences, advancing through and backtracking through nodes in order to determine if they are satisfactory. If the developer wants to edit data which has already been correlated, the game developer can return to edit mode so that the data can be moved out of the compiled game file and new or revised data can be inserted.

When the cursor 81 is temporarily in a fixed position on a particular point on the branched time line, the video sequence will freeze-frame on a particular frame. Thus, if the cursor is moved slowly, the user can view each frame, stopping at each one.

The present invention also provides the ability to jump around the branched time line structure without having to move along it by cursor 81. Turning again to FIG. 1, the dotted line 82 indicates that a cursor such as cursor 81 of FIG. 6, can be moved to any position along the branched time line.

In the simulation mode, the game developer has the option of viewing the branched time line at its highest level or at a lower level. At its highest level, the nodes within nodes would not be revealed. At a lower level, the time line image would reveal the nodes within other nodes. Simple programming means can provide the ability of the game developer to toggle between hierarchy levels.

In simulating game play at the highest level (that is, not viewing nodes within nodes), the present invention provides the ability for the computer to calculate the shortest path through the node having nodes residing therein. Therefore, the present invention provides the ability for the cursor to pass through a node in as seamless a manner as possible. In so doing, the time durations of each complete path of the branched time line structure within the highest level nodes, are calculated and compared to find the shortest time path.

The foregoing description of the preferred embodiment of the present invention has been presented for the purposes of illustration and description. It is not intended to be exhaustive or to limit the invention to the precise form disclosed. Obviously, many modifications and variations will be apparent to practitioners skilled in this art. The embodiment was chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

We claim:

1. A method for developing game using digital video data stored in a data store, implemented by a computer having access to the data store, comprising the steps of:

developing a graphic depiction of a branched time line structure on a first display, said branched time line structure including a first time line portion, a node, a second time line portion and a third time line portion, wherein said first, second and third time line portions are connected to said node;

storing said branched time line structure in said data store;

generating a series of video images on a second display responsive to said digital video data;

selecting a portion of said series of video images so that the corresponding digital video data can be correlated with one of said time line portions;

correlating said corresponding digital video data with one of said time line portions to generate a first data block which can be stored in said data store; storing said first data block in the data store;

selecting a second portion of said video image so that the corresponding digital video data can be correlated with said second time line portion;

correlating said corresponding digital video data with said second time line portion to generate a second data block which can be stored in said data store; and storing said second data block in said data store.

2. A method as recited in claim 1, further comprising the steps of:

selecting a third portion of said video image so that the corresponding digital video data can be correlated with said third time line portion;

correlating said corresponding digital video data with said third time line portion to generate a third data block which can be stored in said data store; and storing said third data block in said data store.

3. A method for developing a game using digital video data stored in a data store, implemented by a computer having access to the data store, comprising the steps of:

developing a graphic depiction of a branched time line structure on a first display, said branched time line structure including a first time line portion, a node, a second time line portion and a third time line portion, wherein said first, second and third time line portions are connected to said node;

storing said branched time line structure in said data store;

generating a series of video images on a second display responsive to said digital video data;

selecting a portion of said series of video images so that the corresponding digital video data can be correlated with one of said time line portions;

correlating said corresponding digital video data with one of said time line portions to generate a first data block which can be stored in said data store; storing said first data block in the data store;

displaying said branched time line structure on said first display wherein a position on said branched time line structure is marked by an indicator coordinated with said branched time line structure;

displaying said video images on said second display in response to the position on the branched time line structure marked by said indicator; and moving said indicator along said branched time line structure on said first display in a manner which causes said video images on said second display to be advanced in a user chosen direction at a user chosen speed.

4. A method for developing a game using digital video data stored in a data store, implemented by a computer having access to the data store, comprising the steps of:

developing a graphic depiction of a branched time line structure on a first display, said branched time line structure including a first time line portion, a node, a second time line portion and a third time line portion, wherein said first, second and third time line portions are connected to said node;

storing said branched time line structure in said data store;

generating a series of video images on a second display responsive to said digital video data;

selecting a portion of said series of video images so that the corresponding digital video data can be correlated with one of said time line portions;

correlating said corresponding digital video data with one of said time line portions to generate a data block which can be stored in said data store; storing said data block in the data store;

displaying said branched time line structure on said first display wherein a position on said branched time line structure is marked by an indicator coordinated with said branched time line structure;

displaying a portion of said video images on said second display which corresponds to the position on the branched time line structure marked by said indicator; and advancing through said video images on said second display in a user chosen direction in a manner which causes said indicator on said branched time line structure on said first display to be moved.

5. A method for developing a game using digital video data stored in a data store, implemented by a computer having access to the data store, comprising the steps of:

developing a graphic depiction of a branched time line structure on a first display, said branched time line structure including a first time line portion, a node, a second time line portion and a third time line portion, wherein said first., second and third time line portions are connected to said node;

storing said branched time line structure in said data store;

generating a series of video images on a second display responsive to said digital video data;

selecting a portion of said series of video images so that the corresponding digital video data can be correlated with one of said time line portions;

correlating said corresponding digital video data with one of said time line portions to generate a data block which can be stored in said data store; storing said data block in the data store;

displaying said branched time line structure on said first display wherein a position on said branched time line structure is marked by an indicator coordinated with said branched time line structure;

at a particular position on said branched time line structure which corresponds to a particular time, ceasing to move said indicator along said branched time line structure in a manner which causes said video images on said second display to cease to be advanced; and causing said indicator to jump from said position on said branched time line structure to a different position on said branched time line structure in a manner which causes the video image on said second display to be displayed out of sequence.

6. A method for developing a game using digital video data stored in a data store, implemented by a computer having access to the data store, comprising the steps of:

developing a graphic depiction of a branched time line structure on a first display, said branched time line structure including a first time line portion, a node, a second time line portion and a third time line portion, wherein said first, second and third time line portions are connected to said node;

storing said branched time line structure in said data store;

generating a series of video images on a second display responsive to said digital video data;

selecting a portion of said series of video images so that the corresponding digital video data can be correlated with one of said time line portions;

correlating said corresponding digital video data with one of said time line portions to generate a data block which can be stored in said data store;

storing said data block in the data store; and altering the length of one of said time line portions so that the length corresponds to the real time of a sequence of said video images to which said time line portion was correlated.

7. A method for developing a game using digital video data stored in a data store, implemented by a computer having access to the data store, comprising the steps of:

developing a graphic depiction of a first branched time line structure on a first display, said first branched time line structure including a first time line portion, a node, a second time line portion and a third time line portion, wherein said first, second and third time line portions are connected to said node, and wherein said step of developing further comprises the step of enclosing said first branched time line structure within the node of a second branched time line structure;

storing said first branched time line structure in said data store;

generating a series of video images on a second display responsive to said digital video data;

selecting a portion of said series of video images so that the corresponding digital video data can be correlated with one of said time line portions;

correlating said corresponding digital video data with one of said time line portions to generate a data block which can be stored in said data store; and storing said data block in the data store.

8. A method for developing a game using digital video data stored in a data store, implemented by a computer having access to the data store, comprising the steps of:

developing a graphic depiction of a branched time line structure on a first display, said branched time line structure including a first time line portion, a node, a second time line portion and a third time line portion, wherein said first, second and third time line portions are connected to said node and wherein said node has a perimeter and includes exits along said perimeter which can be correlated to particular digital video data;

storing said branched time line structure in said data store;

generating a series of video images on a second display responsive to said digital video data;

selecting a portion of said series of video images so that the corresponding digital video data can be correlated with one of said time line portions;

correlating said corresponding digital video data with one of said time line portions to generate a first data block which can be stored in said data store; storing said first data block in the data store;

selecting a portion of said video image so that the corresponding digital video data can be correlated with said exits;

correlating said corresponding digital video data with said exits to generate a second data block which can be stored in said data store; and storing said second data block in said data store.

9. A method as recited in claim 8, wherein said node having a perimeter also includes a perspective indicator which provides the user the ability to advance through an exit, further comprising the steps of:

displaying said node having said exits on said first display;

displaying said correlated portions of said video images on said second display; and adjusting said perspective indicator to cause the video images to be advanced in a user chosen direction.

10. An apparatus for developing a game using digital video data stored in a data store, including a computer having access to the data store, comprising:

means for developing a graphic depiction of a branched time line structure on a first display, said branched time line structure including a first time line portion, a node, a second time line portion and a third time line portion, wherein said first, second and third time line portions are connected to said node;

means for storing said branched time line structure in said data store;

means for generating a series of video images on a second display responsive to said digital video data;

means for selecting a portion of said series of video images so that the corresponding digital video data can be correlated with one of said time line portions;

means for correlating said corresponding digital video data with one of said time line portions to generate a first data block which can be stored in said data store;

means for storing said first data block in said data store;

means for selecting a second portion of said video image so that the corresponding digital video data can be correlated with said second time line portion;

means for correlating said corresponding digital video data with said second time line portion to generate a second data block which can be stored in said data store; and means for storing said second data block in said data store.

11. An apparatus as recited in claim 10, further comprising:

means for selecting a third portion of said video image so that the corresponding digital video data can be correlated with said third time line portion;

means for correlating said corresponding digital video data with said third time line portion to generate a third data block which can be stored in said data store; and means for storing said third data block in said data store.

12. An apparatus for developing a game using digital video data stored in a data store, including a computer having access to the data store, comprising:

means for developing a graphic depiction of a branched time line structure on a first display, said branched time line structure including a first time line portion, a node, a second time line portion and a third time line portion, wherein said first, second and third time line portions are connected to said node;

means for storing said branched time line structure in said data store;

means for generating a series of video images on a second display responsive to said digital video data;

means for selecting a portion of said series of video images so that the corresponding digital video data can be correlated with one of said time line portions;

means for correlating said corresponding digital video data with one of said time line portions to generate a data block which can be stored in said data store;

means for storing said data block in said data store;

means for displaying said branched time line structure on said first display wherein a position on said branched time line structure is marked by an indicator coordinated with said branched time line structure;

means for displaying said video images on said second display in response to the position on the branched time line structure marked by said indicator; and means for moving said indicator along said branched time line structure on said first display in a manner which causes said video images on said second display to be advanced in a user chosen direction at a user chosen speed.

13. An apparatus for developing a game using digital video data stored in a data store, including a computer having access to the data store, comprising:

means for developing a graphic depiction of a branched time line structure on a first display, said branched time line structure including a first time line portion, a node, a second time line portion and a third time line portion, wherein said first, second and third time line portions are connected to said node;

means for storing said branched time line structure in said data store;

means for generating a series of video images on a second display responsive to said digital video data;

means for selecting a portion of said series of video images so that the corresponding digital video data can be correlated with one of said time line portions;

means for correlating said corresponding digital video data with one of said time line portions to generate a data block which can be stored in said data store;

means for storing said data block in said data store;

means for displaying said branched time line structure on said first display wherein a position on said branched time line structure is marked by an indicator coordinated with said branched time line structure;

means for displaying a portion of said video images on said second display which corresponds to the position on the branched time line structure marked by said indicator; and means for advancing through said video images on said second display in a user chosen direction in a manner which causes said indicator on said branched time line structure on said first display to be moved.

14. An apparatus for developing a game using digital video data stored in a data store, including a computer having access to the data store, comprising:

means for developing a graphic depiction of a branched time line structure on a first display, said branched time line structure including a first time line portion, a node, a second time line portion and a third time line portion, wherein said first, second and third time line portions are connected to said node;

means for storing said branched time line structure in said data store;

means for generating a series of video images on a second display responsive to said digital video data;

means for selecting a portion of said series of video images so that the corresponding digital video data can be correlated with one of said time line portions;

means for correlating said corresponding digital video data with one of said time line portions to generate a data block which can be stored in said data store; and means for storing said data block in said data store;

means for displaying said branched time line structure on said first display wherein a position on said branched time line structure is marked by an indicator coordinated with said branched time line structure;

means for, at a particular position on said branched time line structure which corresponds to a particular time, ceasing to move said indicator along said branched time line structure in a manner which causes said video images on said second display to cease to be advanced; and means for causing said indicator to jump from said position on said branched time line structure to a different position on said branched time line structure in a manner which causes the video image on said second display to be displayed out of sequence.

15. An apparatus for developing a game using digital video data stored in a data store, including a computer having access to the data store, comprising:

means for developing a graphic depiction of a branched time line structure on a first display, said branched time line structure including a first time line portion, a node, a second time line portion and a third time line portion, wherein said first, second and third time line portions are connected to said node;

means for storing said branched time line structure in said data store;

means for generating a series of video images on a second display responsive to said digital video data;

means for selecting a portion of said series of video images so that the corresponding digital video data can be correlated with one of said time line portions;

means for correlating said corresponding digital video data with one of said time line portions to generate a data block which can be stored in said data store; and means for storing said data block in said data store; and means for altering the length of one of said time line portions so that the length corresponds to the real time of a sequence of said video images to which said time line portion was correlated.

16. An apparatus for developing a game using digital video data stored in a data store, including a computer having access to the data store, comprising:

means for developing a graphic depiction of a branched time line structure on a first display, said branched time line structure including a first time line portion, a node, a second time line portion and a third time line portion, wherein said first, second and third time line portions are connected to said node, and wherein said step of developing further comprises the step of enclosing said first branched time line structure within the node of a second branched time line structure;

means for storing said branched time line structure in said data store;

means for generating a series of video images on a second display responsive to said digital video data;

means for selecting a portion of said series of video images so that the corresponding digital video data can be correlated with one of said time line portions;

means for correlating said corresponding digital video data with one of said time line portions to generate a data block which can be stored in said data store; and means for storing said data block in said data store.

17. An apparatus for developing a game using digital video data stored in a data store, including a computer having access to the data store, comprising:

means for developing a graphic depiction of a branched time line structure on a first display, said branched time line structure including a first time line portion, a node, a second time line portion and a third time line portion, wherein said first, second and third time line portions are connected to said node and wherein said node has a perimeter and includes exits along said perimeter which can be correlated to particular digital video data;

means for storing said branched time line structure in said data store;

means for generating a series of video images on a second display responsive to said digital video data;

means for selecting a portion of said series of video images so that the corresponding digital video data can be correlated with one of said time line portions;

means for correlating said corresponding digital video data with one of said time line portions to generate a first data block which can be stored in said data store;

means for storing said first data block in the data store;

means for selecting a portion of said video image so that the corresponding digital video data can be correlated with said exits;

means for correlating said corresponding digital video data with said exits to generate a second data block which can be stored in said data store; and means for storing said second data block in said data store.

18. An apparatus as recited in claim 17, wherein said node having a perimeter also includes a perspective indicator which provides the user the ability to advance through an exit, further comprising:

means for displaying said node having said exits on said first display;

means for displaying said correlated portions of said video images on said second display; and means for adjusting said perspective indicator to cause the video images to be advanced in a user chosen direction.

19. A method for developing a computer game from digital video data, said method performed on a computer having computer data storage means for storing data, comprising the steps of:

(a) forming a first time line which corresponds to a first particular amount of time on a first computer display which is coupled to said computer;

(b) connecting a branch node to said first time line on said computer display;

(c) forming second and third time lines so that they are connected to said branch node, each of which corresponds to a second and third particular amounts of time and is sequential with said first amount of time;

(d) on a second computer display which is coupled to said first computer display, viewing images generated from digital video data;

(e) monitoring the amount of passage of real viewing time of said digital video data images and indicating said amount;

(f) blocking a portion of said indicated passage of real viewing time;

(g) correlating digital video data of said blocked portion with said first time line and storing said correlated digital video data in said computer data storage means.

20. An apparatus for developing a computer game from digital video data, said apparatus including a computer, comprising:

a pair of computer displays, coupled to said computer having computer data storage means for storing a time line sequence, digital video data and data generated by correlating said time line sequence and said digital video data;

creating means for creating said time line sequence on said first computer display, said time line sequence including a first time line portion connected to a branch node which is in turn connected to second and third time line portions;

viewing means for viewing images generated from said digital video data on said second computer display;

monitoring means for monitoring the amount of real time said digital video data is viewed on said second computer display so that said amount of time is indicated in a manner which can be blocked;

blocking means for blocking a portion of said indicated amount of time to generate a block of digital video data;

correlation means for correlating said block of digital video data with either said first, second or third time line portions so that it can be stored as correlated data.

* * * * *